United States Patent [19]

Tazuma et al.

[11] Patent Number: 5,049,625
[45] Date of Patent: Sep. 17, 1991

[54] POLYMERIC DIPHENYLDIAMINES

[75] Inventors: James J. Tazuma, Mill Creek, Wash.; Lawson G. Wideman; Paul H. Sandstrom, both of Tallmadge, Ohio

[73] Assignee: The Goodyear Tire & Rubber Company, Akron, Ohio

[21] Appl. No.: 493,093

[22] Filed: Mar. 8, 1990

[51] Int. Cl.$^5$ .................... C08G 73/00; C08K 5/17
[52] U.S. Cl. .................... 525/391; 525/392; 528/392; 528/422; 524/254
[58] Field of Search ............ 528/392, 422; 525/391, 525/392; 524/254

[56] References Cited

U.S. PATENT DOCUMENTS

| | | | |
|---|---|---|---|
| 2,530,769 | 11/1950 | Hollis | 252/401 |
| 3,452,056 | 6/1969 | Sundholm | 260/390 |
| 3,505,225 | 4/1970 | Wheeler | 252/33.6 |
| 3,533,992 | 10/1970 | Sundholm | 260/45.9 |
| 4,182,849 | 1/1980 | Ezzell | 528/392 |
| 4,292,195 | 9/1981 | Morris | 252/401 |
| 4,414,348 | 11/1983 | Gloth et al. | 524/255 |
| 4,417,017 | 11/1983 | Gloth et al. | 524/255 |
| 4,463,170 | 7/1984 | Gloth et al. | 528/422 |
| 4,537,952 | 8/1985 | Gloth et al. | 528/392 |

FOREIGN PATENT DOCUMENTS 61-59325  3/1986  Japan .

Primary Examiner—Kriellion S. Morgan
Attorney, Agent, or Firm—Bruce J. Hendricks

[57] ABSTRACT

This invention relates to a novel class of polymeric compositions which have molecular weights ranging from 300 to 3000 and are the reaction product of (a) an alkyl or cycloalkyl substituted diphenyldiamine and (b) a conjugated or nonconjugated diene. The polymeric diphenyldiamine compounds are particularly useful as an antiozonant in diene containing polymers.

15 Claims, No Drawings

POLYMERIC DIPHENYLDIAMINES

BACKGROUND OF THE INVENTION

As known to those skilled in the art, degradation of rubber from ozone manifests itself by (a) cracks appearing perpendicular to the stress in the rubber and (b) the appearance of a silvery film or frosting on the surface of the article. The attack of ozone is purely a surface phenomenon. The function of the antiozonant depends on its migration to the surface of the rubber article where the battle against the ozone attack can occur.

Conventional diphenyldiamine antiozonants, such as N-phenyl-N'-(1,3-dimethylbutyl)-p-phenylenediamines, are widely used in the protection of rubber. Whereas use of these diphenyldiamine antiozonants have in the past proved quite satisfactory, recent developments in rubber technology has resulted in rubber products with extended service lives and, therefore, require commensurate protection from ozonolysis. These recent developments are particularly apparent in tires. Therefore, there exists a need for new and improved antiozonants offering extended protection from ozonolysis of rubber.

SUMMARY OF THE INVENTION

The present invention relates to polymeric antiozonant compositions and their use in a diene containing polymer. The polymeric antiozonant compositions have a molecular weight ranging from about 300 to about 3,000 and are derived from the polymerization reaction between (a) a diphenyldiamine and (b) at least one conjugated or nonconjugated diene compound. The polymerization is conducted in the presence of an acid catalyst.

DETAILED DESCRIPTION OF THE INVENTION

The present invention relates to a polymeric composition useful as an antiozonant which comprises a polymer having a molecular weight ranging from about 300 to about 3,000 and is the polymeric reaction product of (a) a diphenyldiamine of the formula:

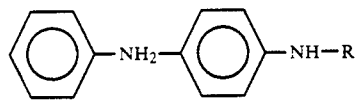

wherein R is a radical selected from the group consisting of an alkyl having from 3 to 16 carbon atoms and a cycloalkyl having from 5 to 12 carbon atoms: and (b) at least one diene selected from the group comprising (1) conjugated dienes consisting of 1,3-butadiene, isoprene, chloroprene, 2-ethyl-1,3-butadiene, 2,3-dimethyl-1,3-butadiene, cyclopentadiene, piperylene: and (2) nonconjugated dienes consisting of 1,4-pentadiene, 1,4-hexadiene, ethyldiene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene and 1,5,9-cyclododecatriene.

There is also disclosed a composition comprising (1) a diene containing polymer and (2) a polymeric antiozonant having a molecular weight ranging from about 300 to about 3,000 and comprises the polymeric reaction product of
(a) a diphenyldiamine of the formula:

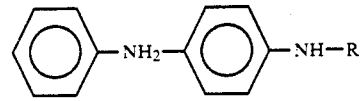

wherein R is a radical selected from the group consisting of an alkyl having from 3 to 16 carbon atoms and a cycloalkyl having from 5 to 12 carbon atoms: and (b) at least one diene selected from the group comprising (1) conjugated dienes consisting of 1,3-butadiene, isoprene, chloroprene, cyclopentadiene, 2-ethyl-1,3-butadiene, 2,3-dimethyl-1,3-butadiene and piperylene: and (2) nonconjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene, limonene, vinylcyclohexene, cyclooctadiene, dicyclopentadiene and 1,5,9-cyclododecatriene.

As can be appreciated after having read the present application, by forming a polymeric diphenyldiamine it is believed that the mobility of diphenyldiamine moiety to migrate to the surface of the host rubber is reduced and therefore a longer period of antiozonant availability is provided. In addition, by using a mixture of polymeric diphenyldiamines which vary in molecular weights, one provides a somewhat "time release" effect controlled by the difference of mobility of each polymeric antiozonant within the host polymer.

As mentioned above, a diphenyldiamine of the above formula is used to prepare the polymeric compositions of the present invention. With respect to the above formula, R may consist of an alkyl having a total of from about 3 to about 16 carbon atoms or a cycloalkyl having from 5 to 12 carbon atoms. Preferably, R is an alkyl having 3 to 8 carbons or a cycloalkyl having 6 carbon atoms. Representative of diphenyldiamines which may be suitable for use in preparation of the compositions of the present invention include N-phenyl-N'-isopropyl-p-phenylenediamine, N-phenyl-N'-(1,3-dimethylbutyl)-p-phenylenediamine, and N-phenyl-N'-(1-methylheptyl)-p-phenylenediamine to name a few. The most preferred diphenyldiamine is N-phenyl-N'-(1,3-dimethylbutyl)-p-phenylenediamine. Many of the above diphenyldiamines are commercially available. For example, N-phenyl-N'-(1,3-dimethylbutyl)-p-phenylenediamine is commercially available from Monsanto Company of St. Louis, Mo. under the designation Santoflex 13. N-phenyl-N'-isopropyl-p-phenylenediamine is commercially available from Pennwalt Corporation of Buffalo, N.Y. under the designation Anto 3H, from Monsanto Company of St. Louis, Mo. under the designation Santoflex IP and from Mobay Chemical Corporation of Pittsburgh, Pa. under the designation Vulkanox 4010NA. N-phenyl-N'-cyclohexyl-p- phenylenediamine is commercially available from Uniroyal Inc. of New York, N.Y. under the designation Flexzone 6H.

The polymeric compositions of the present invention are derived from at least one conjugated or nonconjugated diene. Examples of conjugated dienes which may be used include 1,3-butadiene, isoprene, chloroprene, 2-ethyl-1,3-butadiene, 2,3-dimethyl-1,3-butadiene, piperylene, cyclopentadiene or mixtures thereof. Examples of nonconjugated dienes which may be used include 1,4-pentadiene, 1,4-hexadiene, ethylidene norbornene, 1,4-diisopropenylbenzene, 1,3-diisopropenylbenzene, 1,4-di-$\alpha$-ethylvinylbenzene, 1,3-di-$\alpha$-ethylvinylbenzene, 1-isopropenyl-4-$\alpha$-ethylvinylbenzene, 1-isopropenyl-3-$\alpha$-ethylvinylbenzene, 1-$\alpha$-ethylvinyl-4-$\alpha'$-isopropylvinylbenzene, 1-$\alpha$-ethylvinyl-3-$\alpha'$-isopropylvinylbenzene, 1,4-di-$\alpha$-isopropylvinylbenzene, 1,3-di-$\alpha$-isopropylvinylbenzene, limonene, vinylcyclohexene, cyclooctadiene, dicyclopentadiene, 1,5,9-cyclododecatriene or mixtures thereof. In addition a mixture of conjugated and nonconjugated dienes may be used. The preferred dienes for use in preparation of the present invention are isoprene, piperylene, 1,4-diisopropenylbenzene and 1,3-diisopropenylbenzene.

The terms "polymeric compound" and "polymer" when used to describe the compositions of the present invention are intended to only include those molecules which contain a monomeric unit derived from the diphenyldiamine and diene and where at least one of the monomeric units derived from the diphenyldiamine or diene is repeated. Therefore, the compounds formed by the reaction of a single diphenyldiamine molecule and a single diene molecule are not polymeric as the term is used herein. The term monomeric unit means a structure that occurs in a polymeric compound and which differs from the structure of diphenyldiamine or diene compound due to changes resulting from molecular reorientation during the linking to the adjacent structure. These changes may include addition to a double bond or the addition or removal of a hydrogen atom from the diphenyldiamine or diene.

The molar ratio of the diphenyldiamine to diene in the polymer may vary depending on the desired ratio in the final polymeric product. For example, the molar ratio of the diphenyldiamine to diene as starting material may range from about 1:10 to about 10:1. The preferred molar ratio of diphenyldiamine to diene may range from about 5:1 to 1:5 as starting material. The most preferred ratio ranges from about 2:1 to 1:2. As to the final product, the molar ratio of polymeric units derived from the diphenyldiamine to diene may range from about 8:1 to 1:8. The preferred molar ratio of diphenyldiamine to diene in the final product ranges from about 1:2 to 2:1 with a range of from about 1.1:1 to 1:1.1 being particularly preferred.

The polymerization reaction between the diphenyldiamine and the diene is conducted in the presence of an acid catalyst. Examples of acid catalysts that may be used include Bronsted acid and Lewis acid type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherates. The choice of a particular catalyst is dependent upon many factors including the melting or boiling points of the reactants, desired rate of reaction, solvent, and pressure and temperature limitations of the production equipment, etc. When higher yields are desired, the metal halides or their etherates may be utilized. The preferred acid catalysts are $BF_3$ and $AlCl_3$. The most preferred catalyst is $BF_3$ and its etherate.

The polymerization reaction may be carried out neat (without solvent) at or above the melting points of the reactants or can be carried out in the presence of a solvent. The solvent may be an aliphatic $C_6$–$C_{12}$ hydrocarbon, an aromatic or haloaromatic ($C_6$ to $C_9$) hydrocarbon, or a $C_6$ to $C_9$ aliphatic halohydrocarbon. Examples of suitable solvents are hexane, heptane, benzene, toluene, xylene and chlorobenzene. The preferred solvents are toluene and xylene.

The polymerization reaction may be conducted under a variety of operating conditions. The reaction pressure may vary and range from 1 atm to about 100 atm with a pressure of from about 2 atm to about 10 atm being preferred. The reaction temperature may range from about 25° to 220° C. with the preferred range being from about 140° to 190° C.

Depending on the reactivity of the reactants, amount of catalyst, reaction pressure and reaction temperature, the reaction time may vary. Generally speaking, the reaction time ranges from about 1 to about 8 hours.

In addition to the diphenyldiamine compound and diene, other compounds may be present during the polymerization reaction. For example, many feed streams containing the desired diene may also include other hydrocarbons. Examples of such hydrocarbons include 1,5-dimethyl-5-vinyl-1-cyclohexene, 1-methyl-4-isopropenyl-1-cyclohexene, 1,4-dimethyl-4-vinyl-1-cyclohexene, 1-methyl-5-isopropenyl-1-cyclohexene, 2,5-dimethyl-1,5-cyclooctadiene, 1,5-dimethyl-1,5-cyclooctadiene, 2-methyl-2-butene, butenes, pentenes and hexenes.

The reaction product of the polymerization reaction will generally include a mixture of compounds. These compounds may include simple alkylated diphenyldiamines (not polymeric), and a variety of polymers with varying molecular weights.

The molecular weight of the polymeric compounds of the present invention may vary. For example, when the reactants are 1,3-butadiene and N-phenyl-N'-isopropyl-p-phenylenediamine, the molecular weight may be as low as 334. On the other hand, the molecular weight may be as high as 3000. Preferably, the molecular weight ranges from about 350 to about 3000 with a range of from about 500 to about 2000 being particularly preferred. The above molecular weights are as determined by gel permeation chromatography.

Rubber stocks comprising diene containing polymers subject to ozonolysis may be protected with the compositions of the present invention. Examples of diene containing polymers include substituted and unsubstituted, saturated and unsaturated, natural and synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are α-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene: homopolymers of a conjugated 1,3-diene such as isoprene and butadiene, and in particular, polyisoprenes and polybutadienes having essentially all of their repeat units combined in a cis-1,4-structure: copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a diolefin such as butadiene or isoprene: polyurethanes containing carbon to carbon double bonds: and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene and ethylidene norbornene. The rubber compounds preferably protected by this invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene and butadiene and blends thereof.

The amount of polymeric antiozonants that may be used in the diene containing polymers may vary and depend on the polymer to be protected, the particular polymeric antiozonant, desired protection and the like. Generally speaking, the polymeric antiozonant is used in amounts of from 0.1 to 10 parts per hundred parts (phr) of diene polymer. Preferably, the polymeric antiozonant is used in amounts of from about 1 to about 7 phr, with a range of from about 2 to about 5 phr being particularly preferred.

The polymeric antiozonants may be incorporated in the diene containing polymer by conventional mixing procedures, for example, by adding them in a Banbury mixer or by adding them to the rubber on a mill. With liquid or low melting solid polymeric antiozonants, no special precautions are necessary for obtaining good dispersions. However, when using higher melting polymeric antiozonants, it is recommended that they be ground to a fine powder, preferably 70 micrometer particle size or less to ensure adequate dispersion. Such powders may be treated to suppress dust, for example, by the addition of oil, or they can be mixed with a binder, for example, a polymer latex, and formed into granules or pellets containing up to 5% by weight of binder. They can also be formulated as predispersions or masterbatch in a diene polymer, which predispersions may contain, for example, from 15 to 50% by weight of polymer.

The rubber stocks may include reinforcing carbon blacks, pigments such as titanium dioxide and silicon dioxide, metal oxide activators such as zinc oxide and magnesium oxide, stearic acid, hydrocarbon softeners and extender oils, amine, ether and phenolic antioxidants, phenylenediamine antidegradants and tackifiers. The preferred phenylenediamine antidegradants which may be used in addition to the polymeric antiozonant include N-phenyl-N'-isopropyl-p-phenylenediamine, dicumyl-p-phenylenediamines or mixtures thereof. The stocks may also contain prevulcanization inhibitors but in many stocks their use is unnecessary.

EXAMPLE 1

Into a 1-liter flask equipped with a thermometer, a heating mantle, reflux condenser and nitrogen balloon was charged 130 grams N-phenyl-N'-(1,3-dimethylbutyl)-p-phenylenediamine (0.485 mole) and 85 grams (0.538 mole) of 1,3-diisopropenylbenzene. The mixture was heated to about 120° C. to dissolve the components with occasional stirring. The reaction mixture was cooled to about 75° C. and 18.2 grams of boron trifluoride etherate was added via syringe where a mild exotherm to about 80° C. was observed. The reaction pot was heated to 160°-170° C for 15 hours. The mixture was cooled, dissolved in 500 ml toluene, and washed with aqueous NaOH solution (12 grams NaOH in 200 ml water). The product was dried 16 hours at 100° C. in a vacuum oven to a constant weight. Analysis by GPC showed 34.8% by weight of the mixture had a molecular weight of 2062, 22.4% by weight of the mixture had a molecular weight of 1399, 25.9% by weight of the mixture had a molecular weight of 900, 4.1% by weight of the mixture had a molecular weight of 700, 8.2% by weight of the mixture had a molecular weight of 604 and 4.0% by weight of the mixture had a molecular weight of 519.

EXAMPLE 2

A reaction was carried out under the conditions of Example 1, except 1,4-diisopropenylbenzene was substituted for the 1,3-diisopropylbenzene and the reaction mixture was heated to 160° C. for 3 hours after addition of the catalyst. Analysis by GPC showed 34.2% by weight of the mixture had a molecular weight of 1690, 36.2% by weight of the mixture had a molecular weight of 999, 8.5% by weight of the mixture had a molecular weight of 689, 15.5% by weight of the mixture had a molecular weight of 544, 3.0% by weight of the mixture had a molecular weight of 412 and 1.3% by weight of the mixture had a molecular weight of 368.

EXAMPLE 3

A reaction was carried out under the conditions of Example 1, except 65.3 grams (0.96 mole) of isoprene was substituted for the 1,3-diisopropylbenzene and the reaction mixture was heated to 40° C. when the catalyst was added. The flask was heated to 150° C. for 8 hours after the catalyst was added. Analysis by GPC showed 9.5% by weight of the mixture had a molecular weight of 530, 20.4% by weight of the mixture had a molecular weight of 369 and 67.5% by weight of the mixture had a molecular weight of 338.

EXAMPLE 4

A reaction was carried out under the conditions of Example 1, except limonene (73.4 grams, 0.54 mole) was substituted for the 1,3-diisopropenylbenzene. At about 75° C. when the catalyst was added, an exotherm to about 90° C. was observed. The flask was heated to 170°

C. for 8 hours. GPC analysis showed 2.9% by weight of the mixture had a molecular weight of 525, 15.8% by weight of the mixture had a molecular weight of 409, 18.2% by weight of the mixture had a molecular weight of 382 and 63.1% by weight of the mixture had a molecular weight of 337.

EXAMPLE 5

A reaction was carried out under the conditions of Example 1, except 50 grams (0.72 mole) of a 1.35 molar ratio of piperylene to 2-methyl-2-butene was substituted for the 1,3-diisopropenylbenzene. The catalyst was added at about 40° C. and the mixture heated to 160° C. for 4 hours. GPC analysis showed 12.5% with a molecular weight of 726 and 87.5% with a molecular weight of 450.

EXAMPLE 6

A one-liter flask containing 260 grams (0.97 mole) of N-phenyl-N'-1,3-dimethylbutyl)-p-phenylenediamine and 170 grams (1.07 mole) of 1,3-diisopropenylbenzene) was heated to about 120° C. with stirring under nitrogen to dissolve the N-phenyl-N'-(1,3-dimethybutyl)-p-phenylenediamine. The flask was cooled to about 95° C. and 20 ml of fresh boron trifluoride etherate was slowly added via a syringe. A mild exotherm of about 5° C. was noted. The flask was heated to 180° C. with stirring for 16 hours. The flask was cooled to about 100° C. and 500-1000 ml of toluene were added with stirring to dissolve the product. The product was washed with 12 grams of NaOH dissolved in about 100 ml of water with stirring. The wash solution was colored and drawn off the bottom of the vessel. About 200 ml of water was then added to aid removing any excess NaOH solution. Sodium chloride was added to help separate the phases. The aqueous portion was also drawn off the bottom of the vessel. The product in the toluene solution was filtered through anhydrous sodium sulfate to dry and prevent bumping during stripping (vacuum) of the solvent and lights at greater than 110° C. A melting range of 45°–51° C. from a black shiny solid was found. GPC analysis showed 31.3% with a molecular weight of 3280, 21.6% with a molecular weight of 2140, 26.5% with a molecular weight of 1195, 8.5% with a molecular weight of 632, 8.6% with a molecular weight of 450 and 2.2% with a molecular weight of 349.

EXAMPLE 7

A one-liter 3-neck round bottom flask was fitted with a reflux condenser, thermometer and means of agitation. The system was slowly flushed with nitrogen and charged with 260 grams (0.97 mole) of N-phenyl-N'-(1,3-dimethylbutyl)-p-phenylenediamine and 131 grams of washed isoprene. The reaction mixture was sealed under a nitrogen balloon and heated to reflux to dissolve the N-phenyl-N'-(1,3-dimethyl-butyl)-p-phenylenediamine and isoprene. 20 ml of BF$_3$ etherate catalyst was injected after several minutes of reflux and stirring via a dry syringe. Heat was applied to the flask and reflux continued as the flask was allowed to slowly heat up. The flask temperature of 175°–180° C. was achieved after 2-3 hours and held for 4 hours. The flask was then cooled to about 100° C. and 500 ml of toluene were added with stirring. The reactor contents were stirred for about 15 minutes as the reactor temperature was allowed to drop to about 70° C. An aqueous solution of 12 grams of NaOH in 200 ml of water was added to a 3-liter separatory funnel. The reactor contents were also transferred to the separatory funnel and the contents shaken. The lower aqueous layer was drawn off and replaced with 200 ml of fresh water. The separatory funnel was shaken and the lower aqueous layer separated. The dark product was semi-solid in nature and can be poured out of the containment vessel, however, a bit easier if heated. GPC analysis showed 21.5% had a molecular weight of 825 and 78.5% had a molecular weight of 449.

EXAMPLE 8

A reaction was carried out under the conditions of Example 7, except 130 grams of a mixture of piperylene/2-methyl-2-butene was substituted for the isoprene. The molar ratio of piperylene:2-methyl-2-butene was 1.35:1. GPC analysis showed 12.5% with a molecular weight of 726 and 87.5% with a molecular weight of 450.

EXAMPLE 9

A one-liter round bottom flask containing 260 grams (0.97 mole) of N-phenyl-N'-(1,3-dimethylbutyl)-p-phenylenediamine and 170 grams (1.07 mole) of 1,3-diisopropenyl-benzene was heated to 120° C. with stirring under nitrogen to dissolve the N-phenyl-N'-(1,3-dimethylbutyl)-p-phenylenediamine. The flask and contents were allowed to cool to about 70° C. with a nitrogen sparge slowly bubbling into the dark solution. The nitrogen line was removed and quickly replaced with a BF$_3$ gas line attached to a gross-tared lecture bottle of BF$_3$ gas. The BF$_3$ gas was allowed to bubble into the solution with intermittent addition. The amount of BF$_3$ gas added to the flask was monitored by disconnecting the BF$_3$ line from the lecture bottle and weighing. A partially deflated nitrogen balloon was attached to the flask to monitor BF$_3$ gas that did not stay in solution, however, no appreciable inflating of the balloon was observed. The pot temperature appeared to climb about 10° to 13° C. After addition of the BF$_3$, the pot temperature was raised to 175°–180° C. as quickly as practical with stirring under nitrogen. A total of 16 hours reaction time at 175°–180° C. was completed, but the reaction was cooled at 4-hour intervals for taking sample for HPLC analysis. The HPLC analyses show essentially complete reaction to the desired polymers by 8-12 hours residence time and the product distribution is almost identical to that in Example 6.

Work-up was started by cooling the reaction pot to about 100° C., and adding 500-1000 ml of toluene with stirring. After dissolution, the pot temperature was maintained above 70° C. as 200 ml of water containing 12 grams of NaOH is added and agitated. The organic-/aqueous phase separation occurs very quickly when the temperature is maintained hot. The aqueous layer is drawn off the bottom, and 200 ml of water is added to complete the wash. The pH of the wash water remains basic as determined with the indicator paper. The toluene is then stripped at about 100°–110° C. under reduced pressure. The molten ZONE (MP about 54° C.) can be poured or allowed to flow from the reactor.

EXAMPLE 10

Rubber compositions containing natural rubber, cis-polybutadiene (BUDENE ® 1207), carbon black, processing aids and a sulfur accelerated cure system typical of a tire sidewall were prepared in a BR Banbury using two separate stages of addition. The sulfur and accelerator were added to the Banbury in the second stage, whereas the processing aids were added to the first pass along with the rubbers and carbon black. Different amounts of antiozonant, antioxidant or the product of Example 6 were added during the first stage of mixing. Table I sets out the vulcanizate properties of the rubber compounds. The only difference in composition of the rubber compounds is indicated in Table I. The static ozone resistance of compounds E and F are superior to the other compounds listed in the table. These compounds contain molar equivalent amounts of the product of Example 6 as compared to the antiozonant Santoflex 13. The dynamic ozone resistance of Compound F is also superior to Compound D, which directly compares the product of Example 6 to Santoflex 13. These results clearly illustrate the superior ozone protection of the polymeric diphenyldiamine.

EXAMPLE 11

Rubber compositions containing natural rubber, cis-polybutadiene (BUDENE® 1207), carbon black, processing aids and a sulfur accelerated cure system typical of a tire sidewall were prepared in a BR Banbury using the procedure outlined in Example 10. Table II sets out the vulcanizate properties of rubber compounds comparing the product of Example 2 with Santoflex 13 at molar equivalent levels. The results show improved flex cut growth for the product of Example 2 containing compound and also improved static ozone resistance.

EXAMPLE 12

Rubber compositions containing natural rubber, cis-polybutadiene (BUDENE® 1207), carbon black, processing aids and a sulfur accelerated cure system typical of a tire sidewall were prepared in a BR Banbury using the procedure outlined in Example 10. Table III sets out the vulcanizate properties of rubber compounds comparing Santoflex 13 with a polymeric diphenyldiamine prepared from isoprene, the product of Example 7. The polymeric diphenyldiamine gave improved static ozone resistance when compared to the control containing Santoflex 13.

EXAMPLE 13

Rubber compositions containing natural rubber, cis-polybutadiene (BUDENE® 1207), carbon black, processing aids and a sulfur accelerated cure system typical of a tire sidewall were prepared in a BR Banbury using the procedure outlined in Example 10. Table IV sets out the vulcanizate properties of rubber compounds comparing Santoflex 13 to the polymeric diphenyldiamine prepared in Example 8 (from PIPS/2M2B) and a blend of the two. The polymeric diphenyldiamine containing PIPS/2M2B shows better static ozone resistance on original and aged samples and improved cyclic ozone resistance after preaging of the samples.

TABLE I

|  | A | B | C | D | E | F |
| --- | --- | --- | --- | --- | --- | --- |
| Compound # |  |  |  |  |  |  |
| Santoflex 13 (phr) | 0 | 0 | 3 | 3 | 0 | 0 |
| Wingstay ® 100 (phr) | 0 | 1 | 0 | 1 | 0 | 1 |
| Product of Example 6 (phr) | 0 | 0 | 0 | 0 | 4.9 | 4.9 |
| Stress Strain |  |  |  |  |  |  |
| Tensile Strength (MPa) | 13.9 | 13.5 | 13.5 | 12.9 | 13.7 | 12.3 |
| Elongation at Break (%) | 620 | 590 | 620 | 585 | 660 | 600 |
| 300% Modulus (MPa) | 5.8 | 6.0 | 5.7 | 5.9 | 5.3 | 5.2 |
| Static Ozone* |  |  |  |  |  |  |
| 25% Strain, 168 hours |  |  |  |  |  |  |
| Original Samples | F | F | D4 | A4 | 0 | 0 |
| Preaged Samples (14 days @ 70° C.) | F | F | C4 | B4 | 0 | 0 |
| Dynamic Ozone* |  |  |  |  |  |  |
| 25% Strain, 168 hours |  |  |  |  |  |  |
| Original Samples | F | F | F | D4 | F | D3 |
| Preaged Samples (14 days @ 70° C.) | F | F | F | F | F | C4 |

*Ozone Rating System
0 = no cracking
F = complete failure
Number of cracks
A = very few (less than ¼ surface)
B = few (¼ to ½ surface)
C = moderate (½ to ¾ surface)
D = heavy (¾ to all surface)
Size of Cracks
1 = small (hairline)
2 = medium
3 = large
4 = severe (open)

TABLE II

| Santoflex 13 (phr) | 3 | 0 |
| --- | --- | --- |
| Wingstay ® 100 (phr) | 1 | 1 |
| Product of Example 2 (phr) | 0 | 4.8 |
| Rheometer, 150° C. |  |  |
| Maximum Torque | 34.9 | 33.1 |
| Minimum Torque | 9.0 | 8.5 |
| t90, minutes | 20.0 | 18.9 |
| t25, minutes | 7.8 | 7.3 |
| Stress Strain |  |  |
| Tensile Strength (MPa) | 14.6 | 13.5 |
| Elongation at Break (%) | 540 | 540 |
| 300% Modulus (MPa) | 7.0 | 6.5 |
| DeMattia Flex |  |  |
| Pierced (.08"), 6 hours flex | 1.5" (Failure) | .12" |
| Static Ozone, 25% Strain, 168 hours |  |  |
| Original Samples | D3 | A4 |
| Preaged Samples (7 days @ 70° C.) | D3 | B3 |
| Rebound (ASTM D1054) |  |  |
| 100° C. (%) | 67.2 | 64.8 |

TABLE III

| Santoflex 13 (phr) | 3 | 0 |
| --- | --- | --- |
| Product of Example 7 (phr) | 0 | 3.75 |
| Rheometer, 150° C. |  |  |

TABLE III-continued

| | | |
|---|---|---|
| Maximum Torque | 33.3 | 33.9 |
| Minimum Torque | 9.4 | 9.0 |
| t90, minutes | 23.5 | 20.2 |
| t2, minutes | 8.0 | 6.7 |
| Stress Strain | | |
| Tensile Strength (MPa) | 15.1 | 15.1 |
| Elongation at Break, (%) | 650 | 620 |
| 300% Modulus (MPa) | 5.8 | 6.2 |
| Rebound (ASTM D1054) | | |
| 100° C. (%) | 70.0 | 71.0 |
| Static Ozone | | |
| 25% Strain, 168 hours | C3 | A3 |

TABLE IV

| | | | |
|---|---|---|---|
| Santoflex 13 (phr) | 4 | 0 | 2 |
| Product of Example 8 (phr) | 0 | 4.8 | 2.4 |
| Stress Strain | | | |
| Tensile Strength (MPa) | 14.0 | 13.6 | 13.8 |
| Elongation at Break (%) | 520 | 520 | 520 |
| 300% Modulus (MPa) | 6.9 | 6.6 | 6.8 |
| Rebound | | | |
| 100° C. (%) | 75.5 | 74.0 | 75.0 |
| Static Ozone, 25% Strain, 168 Hours | | | |
| Original Sample | A3 | 0 | 0 |
| Preaged Samples (7 days @ 70° C.) | D2 | B3 | B3 |
| Cyclic Ozone | | | |
| Original | | | |
| 72 hours | 0 | 0 | 0 |
| 216 hours | 1-1 | 1-1 | 1-1 |
| Preaged** | | | |
| 120 hours | ½* | 0 | 0 |
| 192 hours | 1-1 | ½* | ½* |
| 288 hours | Break | 3-3 | 3-3 |
| 384 hours | — | Break | Break |

*Edge
**7 days at 70° C.
Cycle D3395-using a cycled ozone on/off procedure
Density
0 = none
½ = Edge
1 = ¼ surface
2 = ½ surface
3 = ¾ surface
4 = ⅞ surface
Severity
0 = None
1 = .01 in.
3 = .03 in.
5 = .10 in.
10 = .25 in.
12 = +.25 in.

What is claimed is:

1. A polymeric composition useful as an antiozonant which comprises a polymer having a molecular weight ranging from about 300 to about 3,000 and is the polymeric reaction product of
   (a) a diphenyldiamine of the formula:

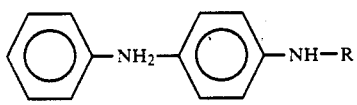

wherein R is a radical selected from the group consisting of an alkyl having from 3 to 16 carbon atoms and a cycloalkyl having from 5 to 12 carbon atoms: and
   (b) at least one diene selected from the group consisting of (1) conjugated dienes consisting of 1,3-butadiene, isoprene, chloroprene, 2-ethyl-1,3-butadiene, 2,3-dimethyl-1,3-butadiene and piperylene: and (2) nonconjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene and limonene.

2. The polymeric composition of claim 1 wherein R is an alkyl having from about 3 to about 16 carbon atoms and the diene is selected from the group consisting of 1,4-diisopropenylbenzene, 1,3-diisopropenylbenzene and isoprene.

3. The polymeric composition of claim 1 having an average molecular weight of from about 300 to about 3,000.

4. The polymeric composition of claim 3 having an average molecular weight of from about 500 to about 2000.

5. The polymeric composition of claim 1 wherein the molar ratio of polymer units derived from diphenyldiamine to diene ranges from about 8:1 to 1:8.

6. The polymeric composition of claim 5 wherein the molar ratio ranges from about 2:1 to 1:2.

7. The polymeric composition of claim 1 wherein said diphenyldiamine and said diene are reacted in the presence of an acid catalyst.

8. The polymeric composition of claim 1 wherein said acid catalyst is a Bronsted acid or Lewis acid.

9. The polymeric composition of claim 8 wherein said acid catalyst is $H_2SO_4$, $HCl$, $H_3PO_4$, $HClO_4$, $BF_3$, $BCl_3$, $AlCl_3$, $AlBr_3$, $SnCl_4$, $ZnCl_2$, $SbCl_3$ and etherates of said acid catalysts.

10. The polymeric composition of claim 9 wherein said acid catalyst is $BF_3$ and $BF_3$ etherate.

11. A composition comprising (1) a diene containing polymer and (2) a polymeric antiozonant comprising the polymeric reaction product of
   (a) a diphenyldiamine of the formula:

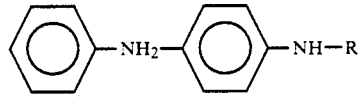

wherein R is a radical selected from the group consisting of an alkyl having from 3 to 16 carbon atoms and a cycloalkyl having from 5 to 12 carbon atoms: and
   (b) at least one diene selected from the group consisting of (1) conjugated dienes consisting of 1,3-butadiene, isoprene, chloroprene, 2-ethyl-1,3-butadiene, 2,3-dimethyl-1,3-butadiene and piperylene: and (2) nonconjugated dienes consisting of 1,4-pentadiene, 1,4-hexadiene, ethylidene norbornene, 1,4-diisopropenylbenzene, 1,3-diisopropenylbenzene, 1,4-di-α-ethylvinylbenzene, 1,3-di-α-ethylvinylbenzene, 1-isopropenyl-4-α-ethylvinylbenzene, 1-isopropenyl-3-α-ethylvinylbenzene, 1-α-ethylvinyl-4-α'-isopropylvinylbenzene, 1-α-ethylvinyl-3-α'-isopropylvinylbenzene, 1,4-di-α-isopropylvinylbenzene, 1,3-di-α-isopropylvinylbenzene; and limonene.

12. The composition of claim 11 wherein said diene containing polymer is selected from the group comprising natural rubber, polyisoprene, polybutadiene, polychloroprene, copolymers of isoprene and butadiene, copolymers of styrene and butadiene, copolymers of acrylonitrile and butadiene, copolymers of acrylonitrile and isoprene and blends thereof.

13. The composition of claim 12 wherein said polymeric antiozonant is present in an amount ranging from about 0.1 to 10 parts per hundred parts of diene polymer.

14. The composition of claim 12 wherein said polymeric antiozonant is present in an amount ranging from about 1 to about 7 parts per hundred parts of diene polymer.

15. The composition of claim 11 additionally containing a phenylenediamine antidegradant selected from the group consisting of N-phenyl-N'-isopropyl-p-phenylenediamine, diaryl-p-phenylenediamines or mixtures thereof.

* * * * *